US011641410B1

(12) United States Patent
Uthaman et al.

(10) Patent No.: US 11,641,410 B1
(45) Date of Patent: May 2, 2023

(54) DISTRIBUTED METRIC COLLECTION FOR DYNAMIC CONTENT DELIVERY NETWORK SELECTION USING DNS

(71) Applicant: Amazon Technologies, Inc., Seattle, WA (US)

(72) Inventors: Karthik Uthaman, Seattle, WA (US); Ronil Sudhir Mokashi, Mercer Island, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 17/030,759

(22) Filed: Sep. 24, 2020

(51) Int. Cl.
*H04L 67/63* (2022.01)
*H04L 67/288* (2022.01)
*H04L 43/06* (2022.01)
*H04L 61/4511* (2022.01)

(52) U.S. Cl.
CPC .............. *H04L 67/63* (2022.05); *H04L 43/06* (2013.01); *H04L 61/4511* (2022.05); *H04L 67/288* (2013.01)

(58) Field of Classification Search
None
See application file for complete search history.

(56) References Cited

U.S. PATENT DOCUMENTS

| 7,496,651 B1* | 2/2009 | Joshi | H04L 29/12792 709/217 |
|---|---|---|---|
| 2010/0125673 A1* | 5/2010 | Richardson | H04L 67/1001 709/239 |
| 2014/0280963 A1* | 9/2014 | Burbridge | H04L 67/125 709/226 |
| 2015/0172379 A1 | 6/2015 | Richardson et al. | |
| 2017/0331721 A1 | 11/2017 | Piecuch | |
| 2019/0215361 A1* | 7/2019 | Lohmar | H04L 67/1008 |

OTHER PUBLICATIONS

Non-Final Office Action, U.S. Appl. No. 17/030,741, dated Apr. 1, 2021, 15 pages.
Advisory Action, U.S. Appl. No. 17/030,741, dated Feb. 15, 2022, 4 pages.

(Continued)

*Primary Examiner* — Kevin T Bates
*Assistant Examiner* — Emad Siddiqi
(74) *Attorney, Agent, or Firm* — Nicholson De Vos Webster & Elliott LLP

(57) ABSTRACT

Techniques for dynamic content delivery network (CDN) selection using the domain name service (DNS) protocol are described. A DNS resolver utilizes a network identifier provided within a DNS query seeking to resolve a domain to select between different CDNs. The selection can be based on an analysis of network metric summary data corresponding to the CDNs from the perspective of an approximate location of the requesting client, as determined via the network identifier as a proxy. The selection process and involved network metric types can be configured by the user associated with the domain via a selection policy. Network metrics can be provided by the user or collected based on reported data generated by remote clients through provided metric-generating code, and thereafter transformed into network metric summary data that is used for resolution.

20 Claims, 12 Drawing Sheets

(56) References Cited

OTHER PUBLICATIONS

Final Office Action, U.S. Appl. No. 17/030,741, dated Dec. 3, 2021, 16 pages.
Non-Final Office Action, U.S. Appl. No. 17/030,741, dated Apr. 26, 2022, 20 pages.
Notice of Allowance, U.S. Appl. No. 17/030,741, dated Oct. 6, 2022, 14 pages.

* cited by examiner

DISTRIBUTED METRIC COLLECTION FOR DYNAMIC CONTENT DELIVERY NETWORK SELECTION USING DNS

BACKGROUND

Computing devices typically utilize one or more communication networks to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf of, or for the benefit of, the general public.

Existing routing and addressing technologies can enable multiple data centers to provide similar or identical content to client computing devices. In some instances, each data center providing a set of content may be referred to as a point-of-presence (POP) of a content delivery system (or other organization) providing the content. Content delivery systems (sometimes referred to as "content delivery networks" or "CDNs") often attempt to connect users to a geographically "nearby" (to the user) POP, as such connections are commonly much faster than connections between the user and geographically-distant POPs or other computing systems. Accordingly, a CDN may implement POPs over a wide area—e.g., worldwide—and route requests for content to "nearby" POPs for fulfillment. For example, a CDN customer may host a set of files (often referred to as a "distribution") for a web page through the CDN. The CDN replicates ones or all of the set of files for the web page in potentially many locations, such as in a POP in Tokyo and another POP in London so that a user in the United Kingdom would be served the web page from the London POP while a user in Japan would be served the web page from the Tokyo POP.

Each POP may be associated with an address on a computing network, such as an Internet Protocol (IP) address. However, requests for content are generally addressed to a human-readable identifier, such as a universal resource identifier (URI) or domain name. To enable use of human-readable identifiers in accessing content, a client computing device can interact with a Domain Name System (DNS) that operates to resolve a domain name into a corresponding network address (e.g., an IP address). Typically, a CDN is associated with one or more domain names, and an operator of CDN will have authority to alter DNS records specifying IP addresses to which those domain names resolve. Thus, the operator of a CDN can utilize DNS records to control how requests to access content of the CDN are routed to POPs.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for dynamic content delivery network (CDN) selection using the domain name system (DNS) protocol. According to some embodiments, a user may configure a resource associated with a domain to be served by multiple CDNs and control the selection of the particular CDNs on a request by request basis using the domain name system (DNS) domain resolution protocol. In some embodiments, a network identifier associated with a client—such as the client's internet protocol (IP) address or an autonomous system number (ASN) associated with the client's IP address—can be provided within a DNS query (e.g., using Extension mechanisms for DNS (EDNS)) to allow a DNS resolver to determine, based on the network identifier, a particular CDN from multiple candidate CDNs. The selection may be based on a set of mappings of location-to-CDN values provided by the user (e.g., indicating a preferred CDN for a particular geographic location (inferred from an IP address), a network location such as an IP address block or ASN, etc.). The selection may additionally or alternatively be made via a selection policy and metric summary data based on network metric values provided by the user or gathered from other systems, e.g., observed or estimated latencies between a location and each CDN, observed or estimated bandwidth between a location and each CDN, observed or estimated buffering issues/conditions between a location and each CDN, etc. Accordingly, a user may enable dynamic selection between CDNs for a resource based on one or more of each client's location, observed or estimated network-associated characteristics of a client's location, etc. Thus, embodiments can simply enable the use of multiple CDNs via a flexible and responsive policy-based selection process.

Figure 1:
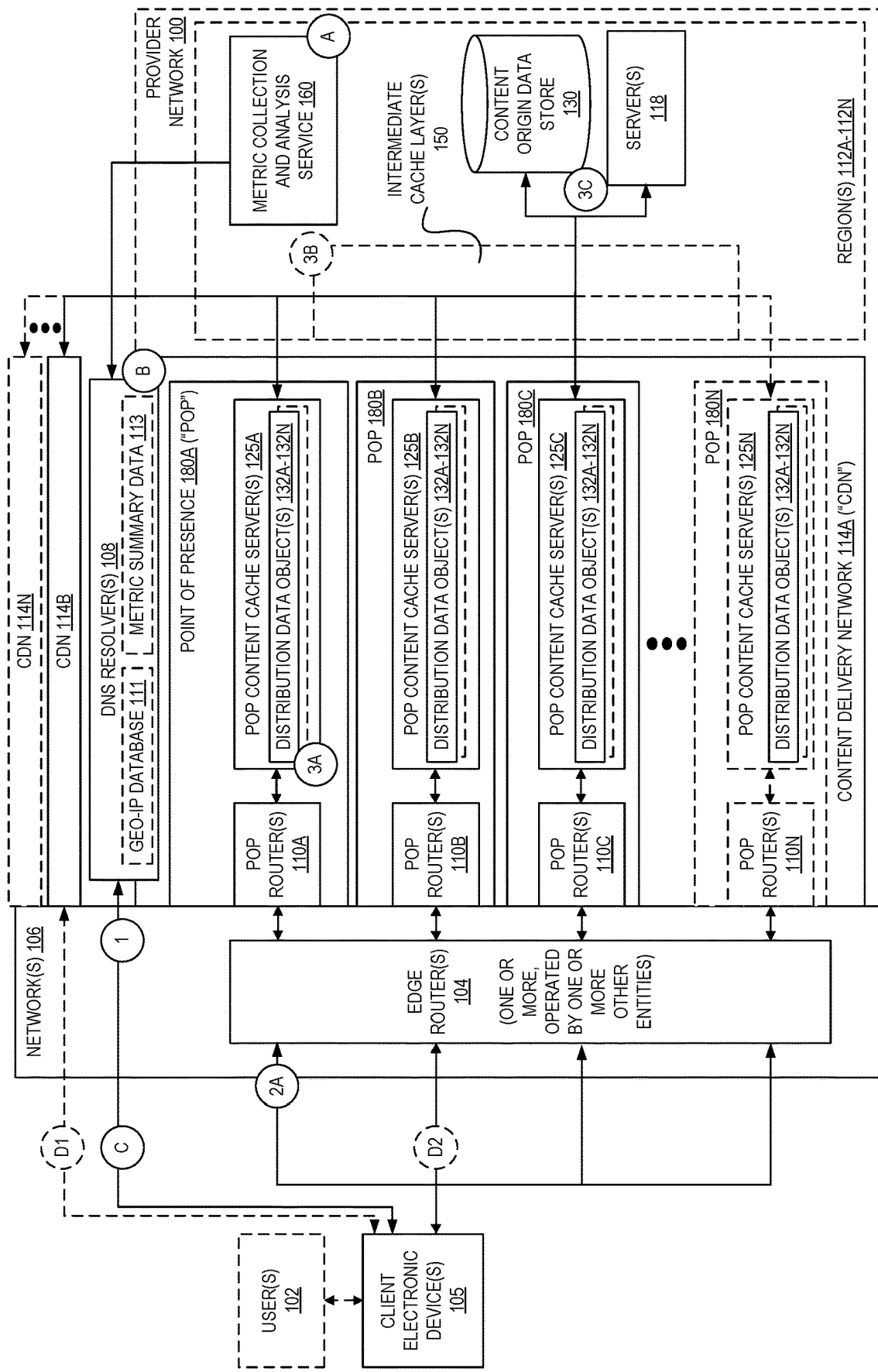
FIG. 1 is a diagram illustrating an environment including point of presence (POP) locations for content provider networks (CDNs) according to some embodiments.

FIG. 1 is a diagram illustrating an environment including POP locations for CDNs according to some embodiments. In FIG. 1, a CDN 114A is illustrated that includes multiple geographically distributed point of presence (POP) 180A-180N locations including POP routers 110A-110N and POP content cache servers 125A-125N, which provide high availability and performance by distributing a service or computing resources spatially relative to end users 102. The POPs 180A-180N may cache and provide access to data objects 132A-132N (e.g., files, other data structures, etc.) of one or more content "distributions" to thereby act as a "front-end" to computing resources at another location, e.g., data objects from a content origin data store 130, server(s) 118, etc., which optionally may be implemented in one or more regions 112A-112N of a provider network 100.

In some embodiments, the CDN 114A may be offered by or in connection with a provider network 100 and implement aspects of a DNS service. A DNS service may be, for example, a highly-available and scalable cloud DNS web service that gives developers and organizations a reliable way to route end users to Internet applications by translating domain names, via one or more DNS resolvers 108, into the numeric network addresses that computing systems use to connect to each other. The DNS service may be an authoritative DNS service that can operate to connect user requests to a CDN and/or to infrastructure running in the provider network 100, such as compute instances of a hardware virtualization service, virtual load balancers, object stores, etc., and thus may be used to route users to infrastructure inside or outside of the provider network 100. The DNS service may also implement DNS health checks to route traffic to healthy endpoints or to independently monitor the health of applications and its endpoints. A DNS service may also manage traffic globally through a variety of routing scheme types, including latency-based routing, Geo DNS, geo-proximity, round robin, weighted round robin, etc., which can be combined with DNS failover techniques in order to enable a variety of low-latency, fault-tolerant architectures. Aspects of a DNS service—such as DNS resolvers 108—can be implemented according to a variety of architectures, and thus may be implemented within the CDN 114A, within a region 112A of the provider network 100, or at another location.

A service provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, CDNs, Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc.

The users 102 (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud service provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute resource, such as a virtual machine, container, etc., when triggered or invoked. In some embodiments, a serverless function can be invoked through an application programming interface (API) call or a specially formatted HyperText Transfer Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time. Thus, an on-demand code execution service (referred to in various embodiments as a function compute service, functions service, cloud functions service, functions as a service, or serverless computing service) can enable customers of the provider network 100 to execute their code on cloud resources without having to select or manage the underlying hardware resources used to execute the code. For example, a customer may be able to user the on-demand code execution service by uploading their code and using one or more APIs to request that the service identify, provision, and manage any resources required to run the code.

In some embodiments, a cloud provider network is formed as a number of regions 112A-112N, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another that a same natural disaster (or other failure-inducing event) should not affect or take more than one AZ offline at the same time.

Customers can connect to an AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence ("POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Figure 2:
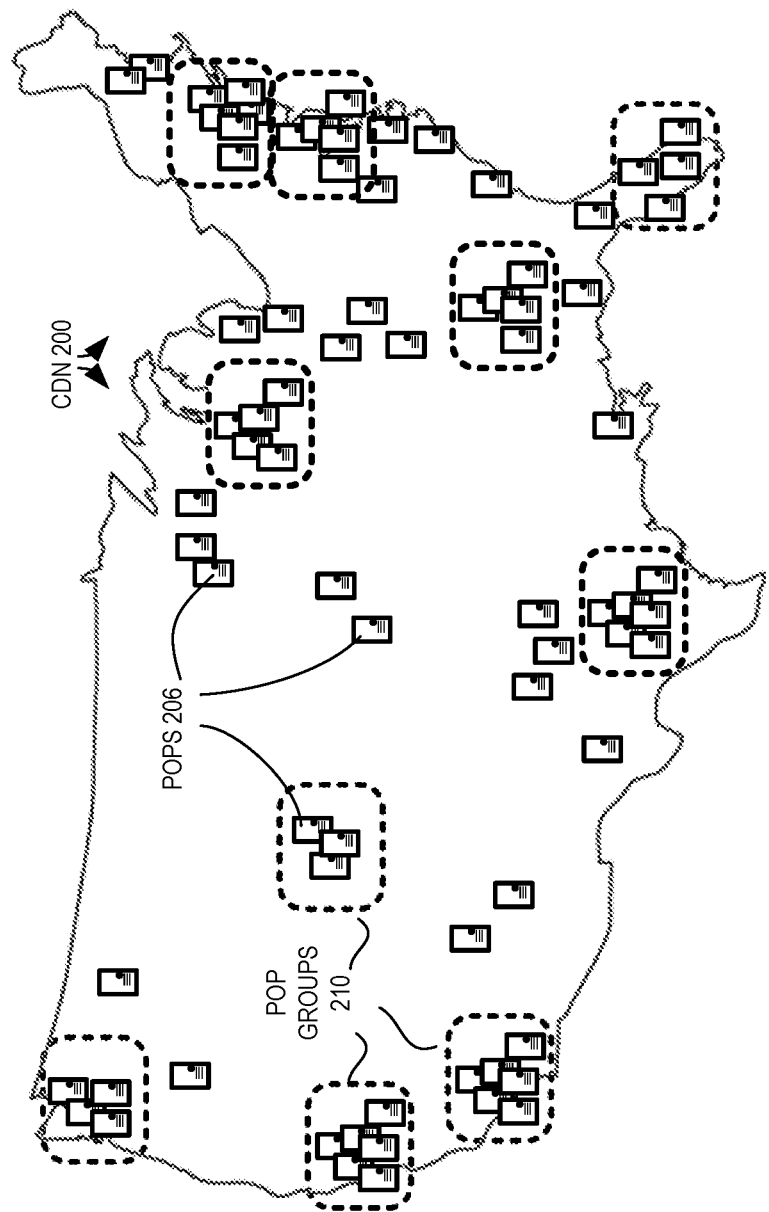
FIG. 2 illustrates an exemplary cloud provider network including geographically dispersed POPs according to some embodiments.

As shown, a provider network 100 includes a CDN 114A having one or more POPs 180A-180N to facilitate content distribution by caching content in the form of distribution data objects 132A-132N closer to end-users. POPs 180A-180N, which may be referred to as one type of "edge location" of the provider network 100, are typically geographically dispersed across cities, states, geographic areas, countries, etc. For example, FIG. 2 illustrates an exemplary CDN 200 including geographically dispersed POPs 206 according to some embodiments. As illustrated, FIG. 2 includes a map of the United States and surrounding areas overlaid with multiple POPs 206, though it is to be understood that POPs may be deployed differently than as shown, in different locations within this map or in other portions of the world, etc., and thus this illustration is exemplary. The CDN 200, in some embodiments, may be a service of a cloud provider network and/or act as a frontend to resources within the cloud provider network, though it may be a separate CDN implemented by another entity.

In comparison to the number of regional data centers or availability zones of a provider network 100, the number of POPs 206 can be much higher. Such widespread deployment of POPs can provide low-latency connectivity to resources (e.g., files, streams, etc.) for a much larger group of end user devices (in comparison to those that happen to be very close to a regional data center). In some embodiments, each POP 206 location can be peered to some portion of the cloud provider network 200 (e.g., a parent availability zone or regional data center). Such peering allows the various components operating in the cloud provider network 200 to manage the compute resources of the POP location, and/or for the POP to have rapid and easy connectivity to the resources of the provider network. In some embodiments, a number of POPs 206 (e.g., two or more POPs) may make up a POP group 210, typically when they share connectivity and/or geographic similarities such that they each provide a relatively same level of service (e.g., latency) to end users in a geographic area.

Turning back to FIG. 1, customers of the provider network may host their resources within the provider network (e.g., files or data objects) or distribute their content through the provider network (e.g., multimedia streams). The customers may thus configure "distributions" of content to be made available through a CDN 114A, allowing the provider network to facilitate the distribution of that content to the customer's users 102 through use of the POPs 180A-180N.

These customers may also provide access to their resources via one or more other CDNs 114B-114N, regardless of whether the resources are actually hosted internal to the provider network or external to the provider network.

A user's 102 request for content (originated by a client of the user's client electronic device 105) may be routed across one or more networks 106 (e.g., via switches, routers 104, and the like) to a POP router 110A-110N of a POP (e.g., POP 180A) that is geographically proximate to the source of the request (that is, the client), and thereafter to one or more POP content cache servers 125 that may fulfill the request from content cached within the POP (e.g., distribution data objects 132A-132N), when available, or obtain the content from a source of the content. In some embodiments, multiple POPs may be in a same geographic area, e.g., scattered around a city, state, collection of cities, or geographic region, and thus several POPs may all be "near" a client.

For example, the POP content cache server(s) (e.g., 125A) at a POP (e.g., 180A) may implement a single or multi-tier cache, in which a request is provided to a "level 1" cache server 125 having access to a small, fast cache of "hot" distribution data object resources of typically many different distributions. In some embodiments, these "level 1" cache resources may be kept in sync among multiple different "level 1" cache servers. If a requested data object resource is not available in this cache (e.g., due to not having been recently requested, or not being requested in a recent amount of time by a relatively large number of clients), the request may be sent to a "level 2" cache server 125 having comparatively more data object storage. If the requested distribution data object is found in this level two cache (or set of caches), it may be returned; otherwise, if the requested data object is still not found, the request may continue on to another cache server 125 that manages connections back to sources of data objects, e.g., to another one or more layers of intermediate cache 150 that optionally may be implemented within a region 112 of the provider network 100, and/or to one or more content data stores 130 and/or server(s) 118, to thus retrieve the data object.

POPs 180 thus represent geographically dispersed portions of the provider network 100, each capable of serving cached distribution data object content to end-users. Such content can include, for example, the web site of a customer of the operator of the provider network 100, a set of audiovisual files, streamed content, etc. For example, Company A can host its website—www.companya.com—from within the provider network 100. The website content, e.g., text, images, scripts, video, markup, or other data, may be stored in a content origin data store 130. In some embodiments, the content origin data store 130 is a volume (or "bucket" or "folder" or other storage collection/location) of a storage service that provides data/storage resources (e.g., object storage, block-level storage, data archival storage, databases and database tables, etc.) using non-volatile storage media such as solid-state drives (SSDs). The content origin data store 130 may thus serve as the content source for caching by the POPs 180, though additionally or alternatively, one or more servers 118 (e.g., web servers executed by one or more server computing devices, which may or may not be within the provider network 100) may also act as a data object content source. In some embodiments, the content origin data store 130 and/or server(s) 188 are located within in a region 112 of the provider network 100 (e.g., as a server implemented by a service of the provider network 100 such as a compute instance run by a hardware virtualization service, a function run by a serverless on-demand code execution service, or the like), and/or within one of the POPs 180 or another "edge location," or even within an entirely different network altogether.

A user 102 may initiate a request for content hosted by (or otherwise made accessible by) the provider network 100 by, for example, commanding a web browser application executing on a client electronic device 105 to issue an HTTP-based request for a resource, utilizing another type of application that can fetch remote resources via HTTP, etc. Examples of such client electronic devices 105 include personal computers (PCs), cell phones, handheld messaging devices, laptop computers, set-top boxes, personal data assistants, electronic book readers, wearable electronic devices (e.g., glasses, wristbands, monitors), and the like. Example HTTP request types include HTTP requests using the GET method (commonly referred to as HTTP GET requests), HTTP requests using the POST method (commonly referred to as HTTP POST requests), etc.

As one example, the user 102 may have typed a portion of a Uniform Resource Locator (URL) or, more generally, a Uniform Resource Identifier (URI), including a full or partial domain (e.g., "www.example.com") into the address bar of a browser, clicked on a hyperlink displayed in a browser, opened another type of application, etc. However, the client electronic device 105 may request a resource responsive to any associated user action, and thus may seek to request a resource on its own, e.g., due to its configuration, based on data it obtains from another source, etc. Thus, in some scenarios a client electronic device 105 could be another type of computing device, such as a server computing device, "smart" device or Internet of Things (IoT) device, etc.

To obtain the resource, the client electronic device 105 may issue a DNS address lookup request (or "DNS query") that identifies the domain ("www.example.com") to a DNS resolver server, which may be managed by the user's Internet Service Provider (ISP)—such as a cable Internet provider, a DSL broadband provider, or corporate network—or by another entity offering DNS lookup services.

Assuming the DNS resolver server is unaware of the mapping between the provided domain name and a network address associated therewith (e.g., it does not have such a mapping entry in its cache), the DNS resolver server may forward the request (to resolve www.example.com) to a non-illustrated DNS root name server, which may return identifiers of one or more name servers for the top level domain (TLD), and the DNS resolver server may again forward the request to one of the non-illustrated TLD name servers for ".com" domains. The name server for ".com" domains may then respond to the request with the names/network addresses of one or more name servers (e.g., DNS resolver 108) of the DNS service that are associated with the requested "example.com" domain Thus, the DNS resolver server chooses a name server (e.g., DNS resolver 108) and forwards the request for "www.example.com" to that name server.

Based on receipt of this forwarded request, the DNS resolver 108, at circle (1), may look in the "example.com" hosted zone for the "www.example.com" record, obtain an associated value—such as the IP address (e.g., 192.0.2.44) associated with a POP 180—and return this IP address to the DNS resolver server.

In some cases, this resolution (or identification of an IP address for a domain) may be based on an estimate or approximation of the location of the client electronic device 105 (e.g., using an IP address of the client, when available, or an identifier of the DNS resolver server). Thus, the DNS resolver 108 can provide a network address of an entry point of a POP 180 that can offer the user the best performance (e.g., due to geographic proximity to the client electronic device 105). For example, POP 180A might be located in San Francisco, Calif., whereas POP 180B might be located in Chicago, Ill. Assuming the client electronic device 105 is estimated to be in Oakland, Calif. (or in Northern California, the Bay Area, etc.), the DNS resolver 108 may return a network address associated with POP 180A due to it being more geographically "close" to the inferred or determined location associated with the client. Knowledge of the location of the client can also allow for location compliance, e.g., certain clients in certain geographic locations may or may not be allowed to access a particular resource.

In some embodiments, DNS resolution (e.g., the resolution of a domain name into a network address) is domain-name independent. Requests for any domain name associated with a content delivery system can be responded to with a network address of any POP of the content delivery system (or with a network address of another CDN 114B-114N). This assumption holds, for example, where all POPs of a content delivery system operate to provide access to any content associated with the content delivery system. Thus, any POP can function to service requests for any content of the content delivery system.

The DNS resolver 108 server now has an IP address that the client needs and may return that value to the client electronic device 105. The DNS resolver server may also cache (store) the IP address for "example.com" for some amount of time so that it can respond more quickly the next time a client needs to resolve "example.com."

The client electronic device 105 then may send a request at circle (2) to obtain the resource at "www.example.com" using the network address (e.g., 192.0.2.44) that it resolved, which may correspond to a POP 180A location. Thus, the request is routed via the one or more networks 106 to the corresponding POP 180A, e.g., via one or more routers 104 of intermediate network(s) 106 that have exchanged routing information with POP routers 110A-110N so that they know which POP is associated with which network addresses. The POP 180A may then obtain (from within a cache server 125 at circle (3A), from an intermediate cache 150 at circle (3B), or via a data source such as content origin data store 130 and/or server(s) 118 at circle (3C)) and return the requested resource (e.g., a web page for www.example.com) to the client electronic device 105, which may then act upon the resource (e.g., a web browser displays the page). Although FIG. 1 illustrates one variant of POP-based resource caching and request fulfillment, other CDN architectures are possible.

Currently, many entities that provide data or media services via the Internet utilize CDNs to provide client-local, rapid access to their data. Some sophisticated entities, for load balancing their traffic to provide the best experience to their users (and to avoid single point of failure in their delivery system) may further use multiple CDNs to provide their content. However, this solution is limited to particular contexts and provides limited benefits.

For example, entities that provide a standalone "app" (e.g., an application for mobile devices) may implement their own custom CDN selection logic within that app, though this is still a tremendously complex and challenging task to implement well. Further, such custom logic is not able to be implemented for users who utilize other means for accessing resources, such as users viewing a media stream or downloading content using a web browser, which uses traditional underlying DNS techniques for identifying the location of a resource. Such schemes largely prevent the ability to implement fine-grained or custom CDN selection logic.

Embodiments disclosed herein provide a new approach to solving this use-case at the DNS layer, e.g., based on use of the EDNS option of client subnet. The Extension mechanisms for DNS (EDNS) is a specification for expanding the size of several parameters of the Domain Name System (DNS) protocol. As is known to those of skill in the art, EDNS adds information to DNS messages in the form of pseudo-Resource Records ("pseudo-RR"s) included in the "additional data" section of a DNS request or response message. One way in which EDNS can be used is for sending general information from resolvers to name servers about clients' geographic location, e.g., in the form of the EDNS Client Subnet (ECS) option. The EDNS client subnet mechanism, which is specified in Internet Engineering Task Force (IETF) Request for Comments (RFC) 7871, describes allowing a recursive DNS resolver to specify the network subnet for the host on which behalf it is making a DNS query.

As shown at circle (A), a user wishing to implement a multi-CDN configuration may interact with a metric collection and analysis service 160 (or "MCA" service) to configure multi-CDN load balancing. For example, the user may cause one or more messages to be sent to provide domain alias information (also referred to herein as "mapping information") providing a mapping between a domain of a resource (e.g., "x1.y2.com") and multiple different domains, provided by multiple different CDNs, that provide the resource (e.g., "x1y2.cdn1.com" and "xy.cdn2.com"). In this manner, the MCA service 160 becomes aware of a domain and multiple CDNs that can provide resources for that domain.

The user may also provide, in the one or more messages, data for a selection policy indicating how the CDNs are to be selected between for particular requests. For example, the user may create or select a policy indicating that a CDN having a lowest latency from a particular client location is always to be selected, or a policy indicating that a CDN is to be selected based on latency using a weighted approach (e.g., an 80% chance of selecting the lowest-latency CDN from the location, a 15% chance of selecting a next-lowest latency CDN from the location, a 5% chance of selecting the third-lowest latency CDN from the location). The policy, in some embodiments, may be based any one or multiple of different network metric value types such as latency, bandwidth/throughput, buffering rates, customer experience score (e.g., a value based on one or multiple other metric values, such as a rating between 0-100, a letter grade, etc.), etc. For example, a policy may indicate that, from the context of a particular client location, a CDN providing the lowest latency is to be chosen, but that in the event of a tie (or if the latency values of multiple CDNs do not differ by some threshold) then another one or more network metric factors should be used as a tie-breaker, such as the one of those tied CDNs having a highest throughput, or lowest buffering rate, etc. As another option, the policy may provide logic to generate a preference score based on multiple network metric summary values, and the CDN/alias having a highest or lowest preference score may be selected.

Additionally, in some embodiments the user may provide CDN preference data (or utilize CDN preference data generated separately, as described later herein) in the form of network metrics associated with the policy. The network metrics may include values for one or multiple network metric types, which may have been measured by the user, manually selected or defined by the user, generated by one or more systems associated with the user, or even generated by various computing devices. Each network metric may correspond to a particular location or group of locations, where the term "location" is meant to be broadly construed to include a geographic location, a network location (e.g., an IP address, an IP address block/CIDR range, a network such as an autonomous system number (ASN)), or other location associated with a client.

Thereafter, the MCA service 160 can configure one or more DNS resolvers 108 with the selection policy, network metrics summary data (e.g., for a metric type, a summary (such as an average) generated based on one or multiple measured network metrics), and domain alias mappings as shown at circle (B). This process may be performed upon the creation of any of this data or a change to any of this data in a manner that is asynchronous to any request issued on behalf of a client, or, in some embodiments, performed in a synchronous manner by the DNS resolver 108 requesting some or all of this information to process a particular request.

Thereafter, when a client electronic device 105 issues a DNS lookup query that specifies a domain (being registered with the MCA service 160 as having multiple CDN-associated domains), a device in the lookup path—e.g., the client device itself, or some network element such as an intermediate DNS resolver—can insert a network identifier into the DNS request (e.g., via the EDNS client subnet extension) that is associated with the client, such as the client's IP address, an ASN associated with the client (e.g., via being associated with the network element performing the insertion, which often belongs to the internet service provider of the client), geolocation, etc.

To resolve the domain specified in the DNS query, the DNS resolver 108 can identify the network identifier within the request and select one of the aliased domains (from one of the multiple CDNs) based on this network identifier. For example, the user associated with the domain may have configured a selection policy to select the aliased domain of the CDN having the lowest latency to the network identifier (e.g., ASN). Thus, continuing the example, the DNS resolver 108 may use a lookup type data structure (e.g., GeoIP database 111) to convert the network identifier (e.g., a client or intermediate resolver IP address) into an ASN, and then use another data structure—or even the MCA service 160— to identify, for the particular ASN, which CDN—of the CDNs that are aliased for the requested domain—has a lowest latency network metric summary value. This selection process may lead to the aliased domain (e.g., "xy.cdn2.com"), which may be returned to the client, though in many embodiments the DNS resolver 108 itself (or via another helper service) may resolve this domain to an actual routable IP address, e.g., 1.2.3.4, and return this value in the DNS response.

Thereafter, the client electronic device 105 may use the returned IP address (or, resolve one, should the DNS resolver have returned the aliased domain) to obtain the requested resource, which may lead to a CDN 114B (that is distinct from the provider network) as shown at circle (D1) or another CDN 114A (that is provided by the provider network) at circle (D2).

Figure 3:
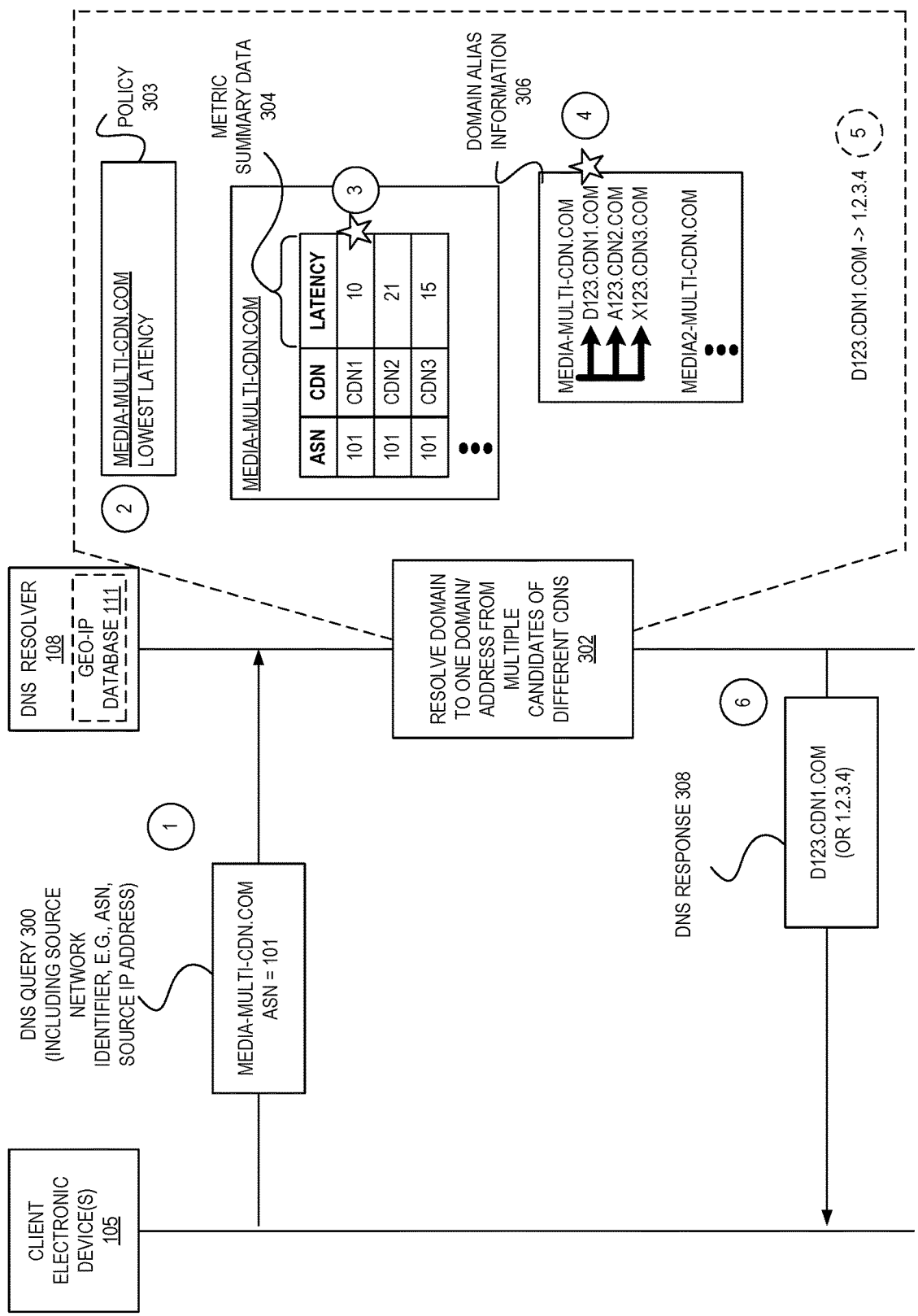
FIG. 3 illustrates dynamic content delivery network selection using DNS according to some embodiments.

For further detail, FIG. 3 illustrates dynamic content delivery network selection using DNS according to some embodiments. As described above, a client electronic device 105 (e.g., a personal computer, laptop, smartphone, tablet, smart device, vehicle, etc.) may seek to obtain a resource such as a media stream, data, etc. To obtain the resource, the client electronic device 105 may send a DNS query 400 at circle (1) including the domain of interest (here, "media-multi-cdn.com"), and the client electronic device 105 (or another entity such as an intermediate DNS resolver or router) may also insert a network identifier associated with the client such as an IP address of the client, an IP address of the resolver, or an ASN (e.g., "ASN=101") of the network that the client (or the entity) belongs to.

Upon receipt, the DNS resolver 108 may optionally translate an IP address network identifier (e.g., using a GeoIP database 111) into an ASN and then at block 302 resolve the domain specified in the DNS query 300 to another domain (or IP address of that other domain) from one of the multiple possible CDNs that provide the resource. In this example, at circle (2) the DNS resolver 108 may obtain a policy 303 defined for the domain and use the policy with the CDN preference data 304 (associated with that particular domain) to identify one of the candidate CDNs. In this example, we stipulate that the policy indicates that a CDN having a lowest latency is to be selected. Thus, based on identifying those entries for the same network identifier as carried in the DNS query (here, those entries pertaining to ASN 101), the entry having a lowest latency is selected— here, the latency of ten is selected that corresponds to "CDN1" at circle (3). With this identified CDN, the DNS resolver 108 may then identify the aliased domain provided by that CDN using domain alias information 306 at circle (4), which may include performing a lookup into a data structure using the provided domain to identify multiple aliased domains (provided by the multiple CDNs) and identifying the aliased domain ("D123.CDN1.COM") provided by the selected domain ("CDN1"). In some embodiments, this aliased domain ("D123.CDN1.COM") may be returned, though in other embodiments this aliased domain may be resolved by the DNS resolver 108 at optional circle (5) to obtain an IP address (or a cached previously-resolved IP address) that can be returned in the DNS response 308 at circle (6).

Figure 4:
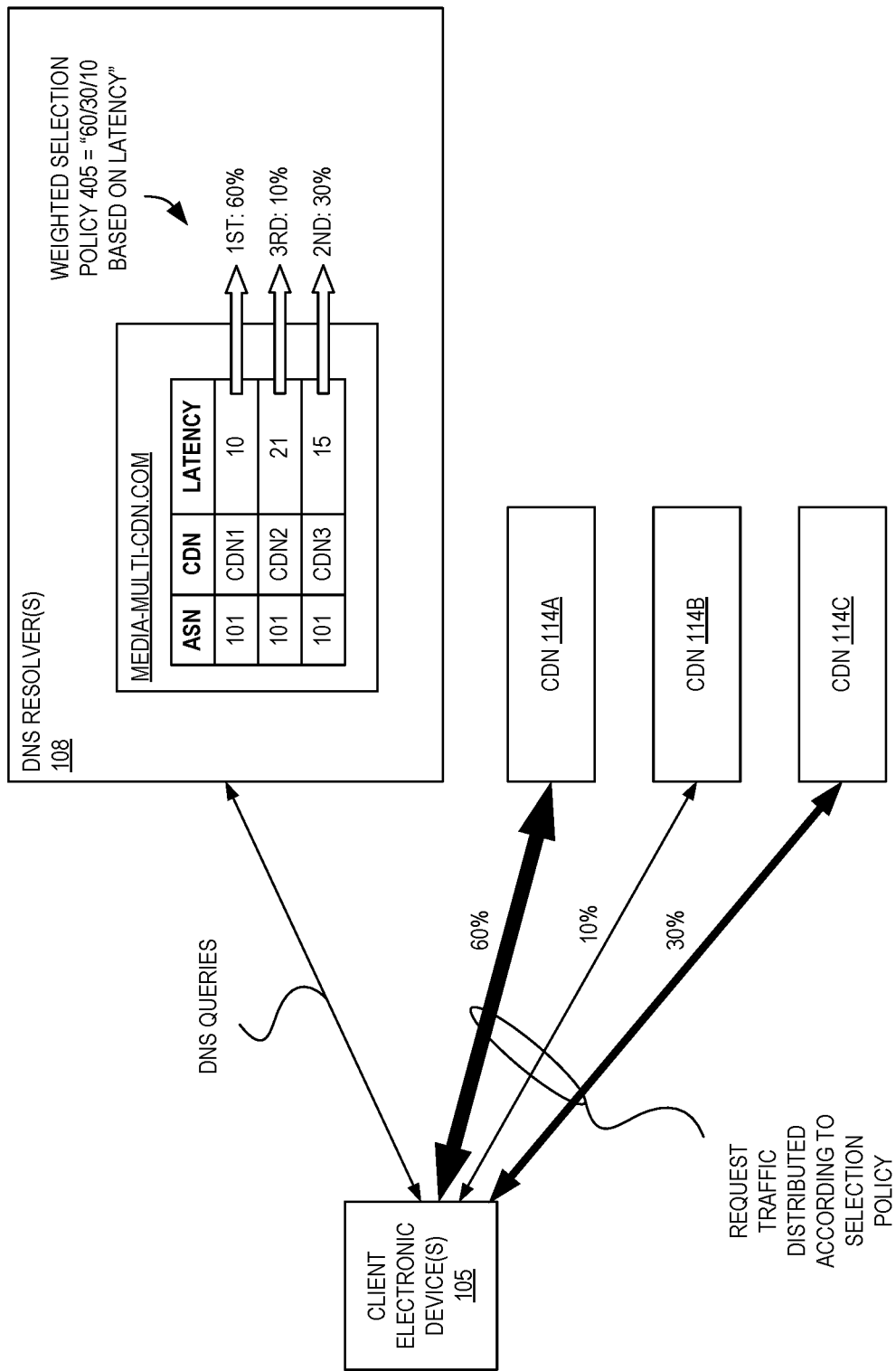
FIG. 4 illustrates the use of a single network metric type with a weighted selection policy for dynamic content delivery network selection using DNS according to some embodiments.

As described herein, this approach enables the use of a variety of policies (or even combinations of multiple policies) selected by the involved users that may be simple or complex, and may be based on potentially limitless types of information such as other types or combinations of network metric types. For example, FIG. 4 illustrates the use of a single network metric type with a weighted selection policy for dynamic content delivery network selection using DNS according to some embodiments. In this example, a policy 405 is defined that distributes requests from a particular ASN across multiple CDNs according to a ratio—here, a 60/30/10 breakdown where 60% of requests will be resolved to a lowest latency, 30% of requests will be resolved to a next-lowest latency, and 10% of requests will be resolved to the third-lowest latency. In some embodiments, the DNS resolver 108 may implement this policy by assigning weights corresponding to these breakdowns to the CDNs based on their latencies, so that CDN1 has a 60% chance of being selected, CDN2 has a 10% chance of being selected, and CDN3 has a 30% chance of being selected. Thus, for a particular resolution request, the DNS resolver 108 may select one of these CDNs according to the weighting, causing the ultimate request traffic to roughly (or, precisely in different approaches) be distributed among the CDNs as reflected by the arrows of varying widths.

Figure 5:
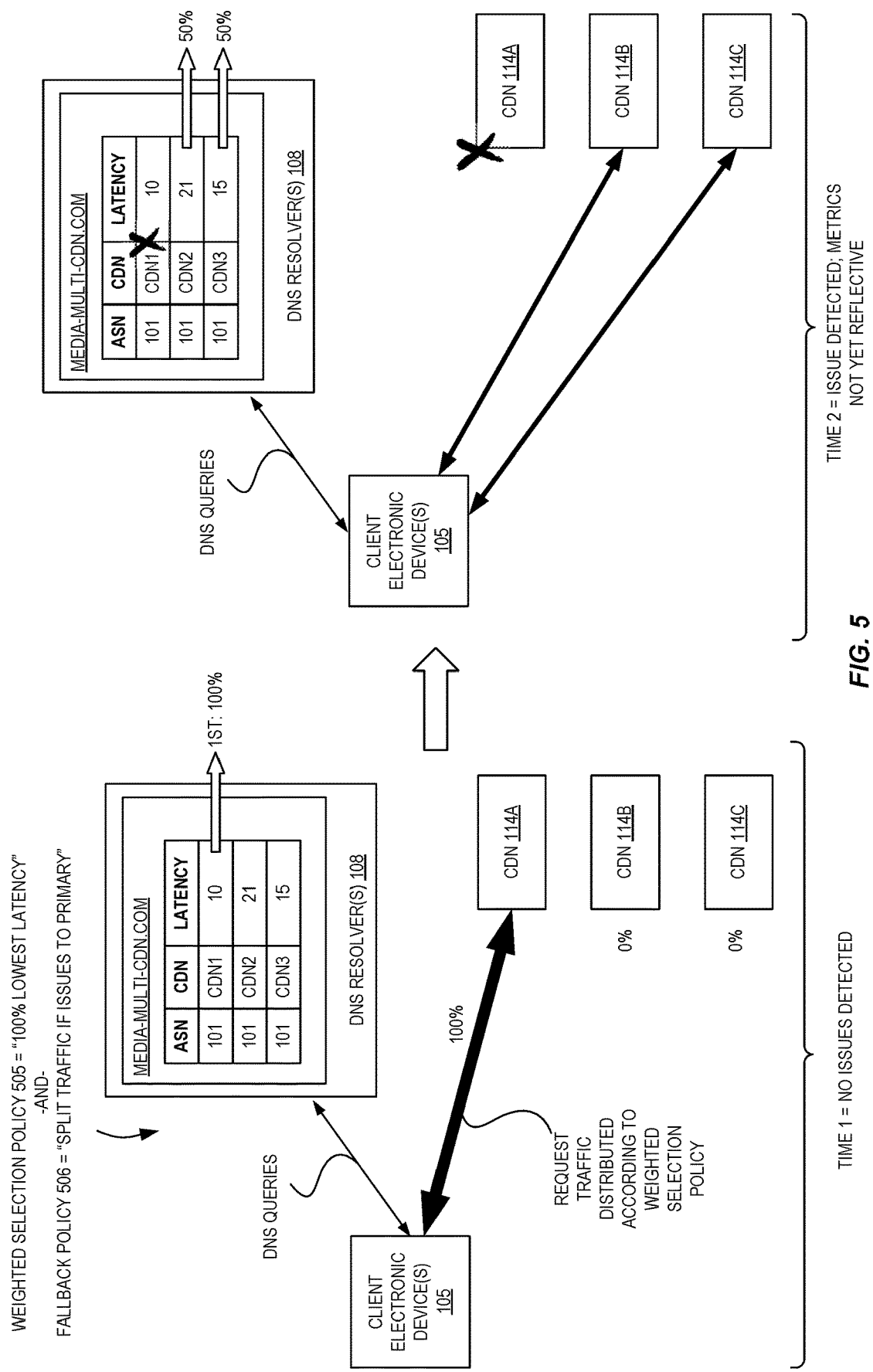
FIG. 5 illustrates the use of a single network metric type with a different weighted selection policy and a fallback policy for dynamic content delivery network selection using DNS according to some embodiments.

FIG. 5 illustrates the use of a single network metric type with a different weighted selection policy 505 and a fallback policy 506 for dynamic content delivery network selection using DNS according to some embodiments. In this example, a simpler policy 505 may be used where 100% of the requests are to be resolved to the lowest-latency CDN—here, CDN1. As a result, as long as this CDN remains having the lowest latency, all resolution requests for the domain will be resolved to that CDN, as reflected by the single arrow between the client electronic device(s) 105 and CDN 114A. However, in some embodiments multiple policies may be defined for use, where the policies may have a priority or prioritization that can be determined. For example, in this example a fallback policy 506 may also be defined that indicates that traffic is to be split among all other CDNs in the case that a "best" CDN (according to another policy, e.g., policy 505) is detected to be having some type of issue. It may be the case that failures or disruptions involving a particular CDN may be able to be detected more rapidly than network metric summary data values are updated; in this scenario, a CDN might be selected by the policy 505 despite the CDN being non-reachable or acting in a degraded mode. In this case, the DNS resolver(s) 108 may be able to determine that the condition exists for a particular CDN (e.g., by being notified via another channel) and via evaluating the second fallback policy 506 determine to instead split the traffic between the other CDNs; here, as shown on the right side of the figure, the traffic can be distributed approximately equally between CDNs 114B-114C.

Figure 6:
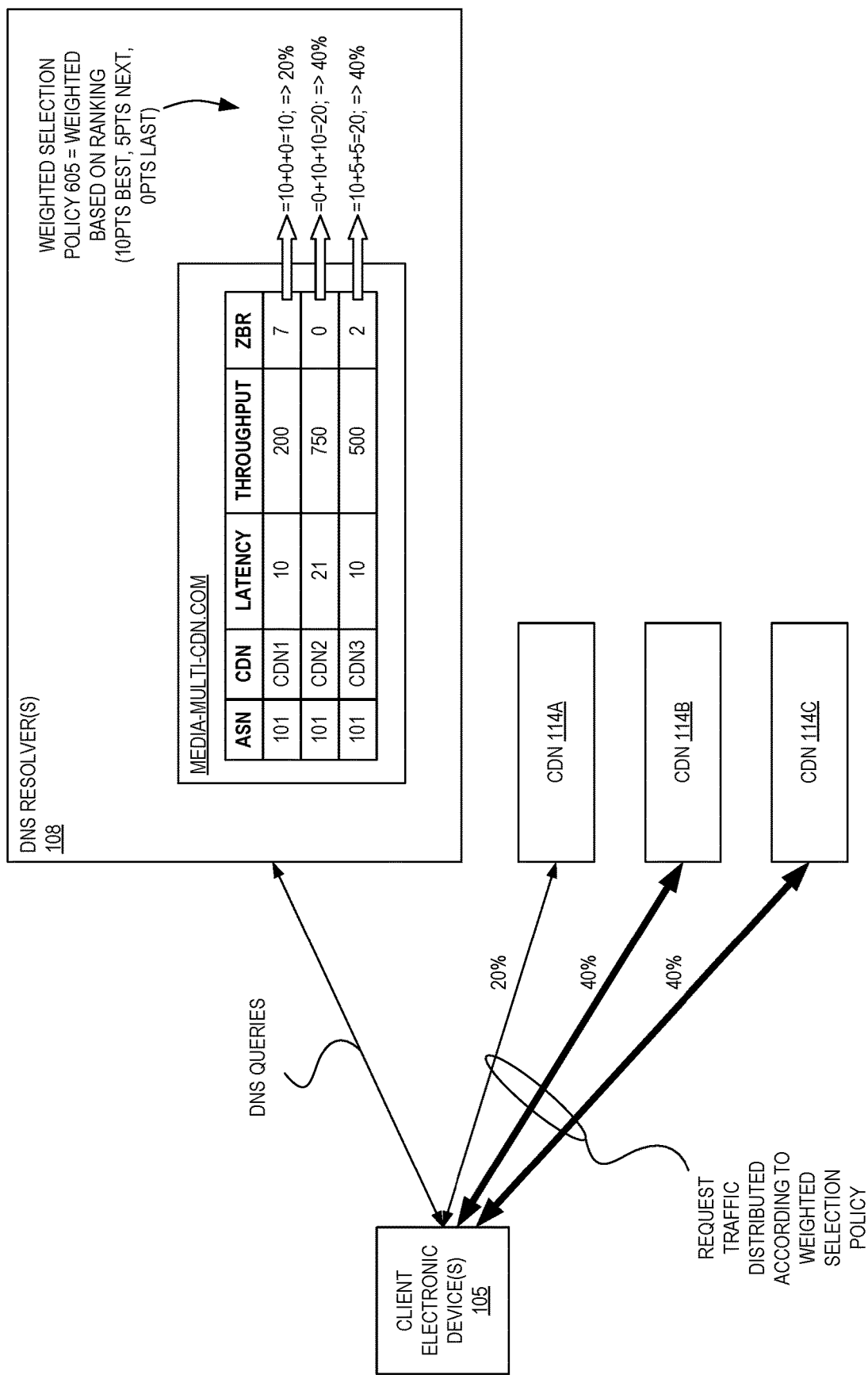
FIG. 6 illustrates the use of multiple network metric types with a multi-level weighted selection policy for dynamic content delivery network selection using DNS according to some embodiments.

FIG. 6 illustrates the use of multiple network metric types with a multi-level weighted selection policy for dynamic content delivery network selection using DNS according to some embodiments. In this example, a multi-factor policy is enabled that calculates a score for each candidate CDN. Here, the policy formula indicates that each CDN will get ten points for each network metric type it has the comparative best value for, five points for each network metric type it has the second-best value for, and zero points for each network metric type it has the worst value for. In this example, the first CDN1 has the best latency value (for ten points) but the worst throughput and "zero buffer rate" (or "ZBR", indicating an amount of times a client—such as a video streamer application—has an empty buffer due to issues with the media stream it receives from that CDN). As a result, CDN1 is granted ten points. CDN2 receives twenty points, as it has the best throughput and ZBR, and CDN3 also receives twenty points due to having the best latency (as a tie) and is second-best ZBR. Accordingly, the policy indicates that these CDNs are to be selected according to a weighting based on these scores, e.g., CDN1 got ten points out of the fifty awarded, so thus will be weighted at 20%. Likewise, CDN2 and CDN3 each got twenty points out of the fifty awarded, and thus they each will receive a 40% weighted chance of being selected. As a result, the ultimate request traffic is distributed amongst the three CDNs 114A-114C roughly according to these weights.

As described herein, in some embodiments the user associated with the domain may provide network metric data on a periodic basis to adjust the distribution of traffic among the multiple CDNs as. This may allow for the balancing to change over time, for example, based on the network characteristics of interest to the user. For example, if a particular CDN begins to perform poorly in a particular area (e.g., due to outages, deployment changes, etc.) as updated network metric data is fed into the system, the distribution of traffic will automatically change as the effects of the poor performance shows up in the network metric summary data. In some embodiments, some users may benefit from this configuration as they can both obtain the particular network metrics of interest and thereafter provide them for use when they so desire. For example, these users may have a large amount of testing infrastructure deployed in various locations, or may have a large base of users utilizing apps that have testing logic integrated into them, and thus it is relatively easy to obtain real-world metric data of interest.

However, in some embodiments, users may not have this infrastructure available, have the desire to implement it, or may wish to benefit from these dynamic CDN selection techniques immediately. Accordingly, in some embodiments network metrics may be collected and provided to the MCA service 160 without any (or without any significant) user involvement.

Figure 7:
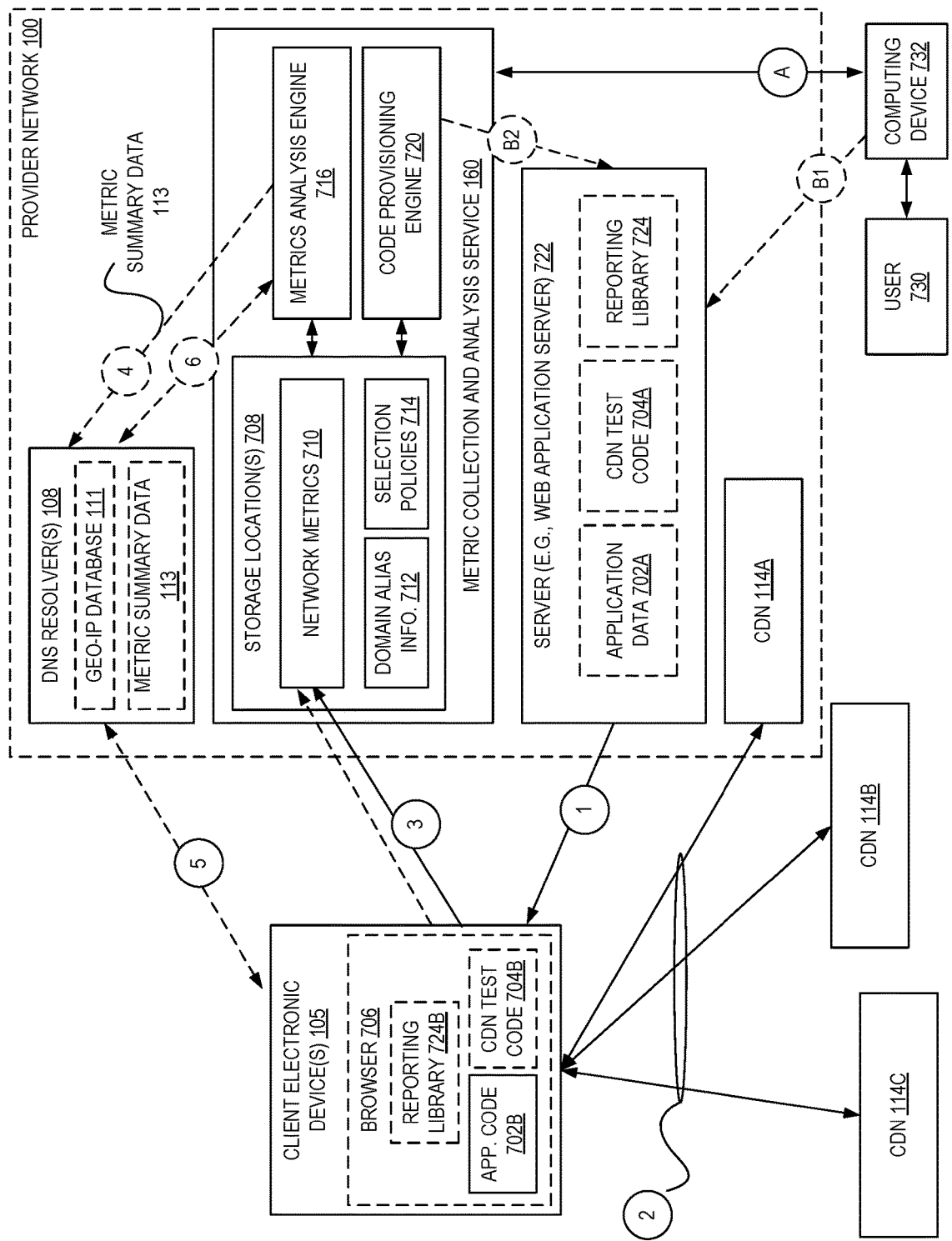
FIG. 7 is a diagram illustrating a distributed metric collection system for dynamic content delivery network selection using DNS according to some embodiments.

For example, FIG. 7 is a diagram illustrating a distributed metric collection system for dynamic content delivery network selection using DNS according to some embodiments. In some embodiments, the MCA service 160 includes a code provisioning engine 720 that can generate or configure code—e.g., JavaScript code, JAVA code, etc.—that can ultimately be executed by client electronic devices 105 to cause the client electronic devices 105 to generate network metrics and provide the network metrics back to the MCA service 160.

For example, upon a user 730 at circle (A) utilizing a computing device 732 to interact with the MCA service 160 to configure dynamic CDN selection with domain alias information 712 (e.g., that identifies CDNs of interest), and/or provide network metrics of interest via selection policies 714, the code provisioning engine 720 of the MCA service 160 may generate code 704 including commands that cause the executing system to generate those network metrics. This code may be provided to the user, who may then cause it to be included in (or referenced by) a website or web-backed application of the user (as shown at circle (B1)) or even a standalone application (e.g., provided by an application storefront or other system), and thus the code is ultimately provided to clients who utilize that application. This may, in some cases, lead to the code being served via the CDNs 114A-114C. Additionally, or alternatively, the MCA service 160 may provide a reporting library 724 of code that can be used (e.g., by the user's application) to provide network metric data back to the MCA service 160. For example, the library 724 may expose an interface to an application that can easily be used to package network metrics and transmit it to the MCA service 160 (e.g., via API calls); this may allow the application to generate its own "custom" network metrics and simply use the reporting library 724 to upload these metrics.

Alternatively, or additionally, the code provisioning engine 720 at circle (B2) may cause the code to be provided as CDN test code 704A and/or reporting library 724 to an application server 722 (e.g., a webserver of that user, or possibly a webserver of an entirely different person or entity, such as the operator of the provider network) that can include the code 704A and/or reporting library 724 within or aside application data 702A (e.g., a library, an HTML page, etc.) that is provided to client electronic devices 105 at circle (1). In such cases, such as when the code 704A and/or reporting library 724 is provided to an application server 722 of a non-associated user (such as the provider network's application server 722), the CDN test code 704A may have been generated previously to generate a variety of different network metrics, and thus may not be only limited to just the user's preferred network metrics of interest.

When the application code 702B is loaded (e.g., by a browser 706 or other application), which may include the CDN test code 704B or reference it (e.g., causing the browser 706 to fetch it), the one or more commands specified by the code are executed, causing the client electronic devices 105 to interact with one—or multiple—different CDNs 114A-114C as shown by circle (2). For example, the commands may cause the client electronic devices 105 to "ping" each CDN (e.g., to determine a latency), to download a small file (e.g., to determine latency), to download a larger file (e.g., to determine latency and/or throughput), to stream a media item such as a video (e.g., to determine throughput, error rates, zero buffer rates, etc.), or a variety of other types of tests known to those of skill in the art. The CDN test code 704B may then construct network metrics based on these tests and upload them at circle (3) to one or more storage locations 708 (e.g., an object store provided by a storage service, a database, etc.) as network metrics 710. This uploading may be performed by the application code 702B itself (e.g., via writing to a database or object storage location), by the application code 702B through the reporting library 724B, by the CDN test code 704B itself, or by the CDN test code 704B using the reporting library 724B, for example.

As the raw network metrics 710 are provided, a metrics analysis engine 716 may transform the raw network metrics (e.g., which may be time-series data) into network metric summary values that can be more easily used by the DNS resolvers 108 as described and shown herein. For example, many different latency values may be provided for a particular CDN for a particular location from one or multiple data sources (e.g., computing devices), and all of these metrics may be consolidated into a network metrics summary data value that is an average (or moving/weighted average, or maximum, or minimum, or some other statistical measure) of the individual metric values from some time period (the last hour, day, week, etc.). In this manner, for each CDN, the metrics analysis engine 716 can generate a network metric summary data element for each involved metric type—e.g., a single latency value, a single throughput value, etc.—which is comparatively small and thus easy to both store, query, and utilize by the DNS resolvers, which may have limited computing resources available and thus efficiency of storage, retrieval, and processing is important. Accordingly, the metrics analysis engine 716 may provide these network metric summary data elements at circle (4) to the DNS resolvers 108 for use as described herein when resolving DNS queries as shown by circle (5). Alternatively, or additionally, in some embodiments the DNS resolvers 108 may not maintain the network metrics (e.g., via flushing network metrics that have not been used recently, or by not caching them at all) but instead call the metrics analysis engine 716 in a synchronous manner (e.g., during the resolution of a domain) at circle (6) to get the needed transformed network metrics 710, domain alias information 712, and/or selection policies 714.

Beneficially, embodiments can allow for users to utilize these DNS-based techniques for CDN selection even if the users do not immediately have network metrics to rely upon. For example, in some embodiments the user may provide a preferred selection policy (e.g., a weighted policy based heavily on one or more types of network metrics) but initially a different selection policy may be used, for example, until a threshold amount of network metrics have been collected from the user or on behalf of the user. For example, initially the selection policy may simply involve distributing the selection of CDNs according to a round-robin or random scheme. Thereafter, once a sufficient amount (e.g., a threshold set according to the system configuration, or according to the user's configuration) of network metrics have been obtained, the selection policy may be switched to the user-selected policy (e.g., involving weighting, relying on the network metric summary data, etc.).

Accordingly, embodiments can provide an extremely simple way for users to gain the benefits of network metric based routing between CDNs, e.g., via using network metrics generated by others, via simply using a small library 724 or auto-generated code 704 to generate and/or provide metrics to the MCA service 160. Thus, in one example embodiment, a user may simply indicate which metric types are of interest, and either use third-party generated network metrics or be provided code and/or a library to be straightforwardly embedded in (or referenced by) their own application.

Figure 8:
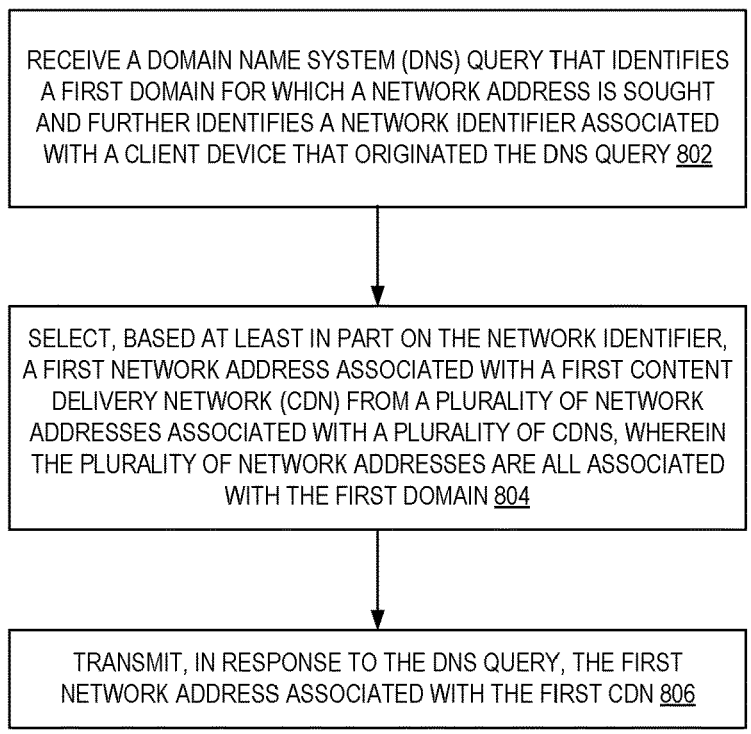
FIG. 8 is a flow diagram illustrating operations of a method for dynamic content delivery network selection using DNS according to some embodiments.

FIG. 8 is a flow diagram illustrating operations 800 of a method for dynamic content delivery network selection using DNS according to some embodiments. Some or all of the operations 800 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 800 are performed by the DNS resolver(s) 108 (and/or MCA service 160) of the other figures.

The operations 800 include, at block 802, receiving a domain name system (DNS) query that identifies a first domain for which a network address is sought and further identifies a network identifier associated with a client device that originated the DNS query. In some embodiments, the DNS query comprises an Extension mechanisms for DNS (EDNS) query. In some embodiments, the network identifier associated with the client device comprises an IP address utilized by the client device or an IP address utilized by an intermediate DNS resolver. In some embodiments, the network identifier associated with the client device comprises an autonomous system number (ASN).

In some embodiments, the operations 800 further include receiving, from a user associated with the first domain, mapping information identifying the plurality of CDNs. In some embodiments, the mapping information associates the first domain with a plurality of domains corresponding to the plurality of CDNs.

The operations 800 further include, in some embodiments, receiving, from a device of a user associated with the first domain, for each of a plurality of locations, network metrics associated with the plurality of CDNs. In some embodiments, the network metrics include at least one of: a customer experience value; latency value; a throughput value; an error rate; or a buffer exhaustion rate.

The operations 800 further include, at block 804, selecting, based at least in part on the network identifier, a first network address associated with a first content delivery network (CDN) from a plurality of network addresses associated with a plurality of CDNs, wherein the plurality of network addresses are all associated with the first domain. The operations 800 further include, at block 806, transmitting, in response to the DNS query, the first network address associated with the first CDN.

In some embodiments, selecting the first network address comprises: identifying, based on the network identifier, one of the plurality of locations; and evaluating a plurality of the network metrics, corresponding to the one location, based on a selection policy. In some embodiments, the selection policy indicates that the network address associated with the CDN having a smallest or largest network metric summary value is to be selected. In some embodiments, the selection policy indicates that the network address is to be selected using a weighted selection scheme based on the network metric summary data.

Figure 9:
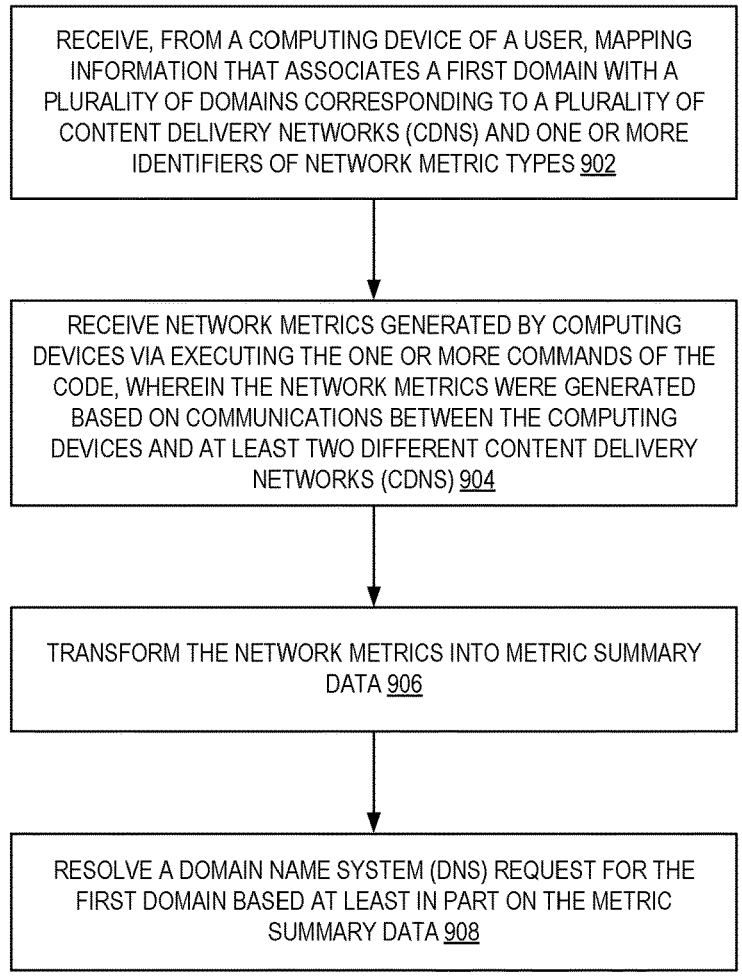
FIG. 9 is a flow diagram illustrating operations of a method for distributed network metric collection for dynamic content delivery network selection using DNS according to some embodiments.

FIG. 9 is a flow diagram illustrating operations 900 of a method for distributed network metric collection for dynamic content delivery network selection using DNS according to some embodiments. Some or all of the operations 900 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 900 are performed by the DNS resolver(s) 108 and/or MCA service 160 of the other figures.

The operations 900 include, at block 902, receiving, from a computing device of a user, mapping information that associates a first domain with a plurality of domains corresponding to a plurality of content delivery networks (CDNs) and one or more identifiers of network metric types;

The operations 900 further include, at block 904, receiving network metrics generated by a plurality of computing devices, wherein the network metrics were generated based on communications between the plurality of computing devices and the plurality of CDNs.

The operations 900 further include, at block 906, transforming the network metrics into metric summary data, and at block 908, resolving a domain name system (DNS) request for the first domain based at least in part on the metric summary data.

The operations 900 further include, in some embodiments, further include transmitting code that includes one or more commands that when executed generate network metrics. In some embodiments, the transmitting of the code comprises transmitting the code to the computing device of the user, wherein the user embeds the code into a web application or references the code by the web application. The operations 900 further include, in some embodiments, generating the code or configuring the code based on the one or more identifiers of the network metric types.

In some embodiments, at least one of the network metric types comprises: a customer experience score; a latency; a throughput; an error rate; or a buffer exhaustion rate.

The operations 900 further include, in some embodiments, configuring a web application to include or reference the code, wherein the web application is not associated with the first domain, and wherein the transmitting of the code comprises transmitting the code to a plurality of computing devices of a plurality of users not associated with the first domain.

In some embodiments, the message further indicates one or more policies indicating how to select between the plurality of CDNs based on the metric summary data.

The operations 900 further include, in some embodiments, for a first period of time, resolving requests to identify a network address associated with the first domain according to a pure or weighted round-robin scheme between the plurality of CDNs. The operations 900 further include, in some embodiments, determining that a threshold amount of network metrics for each of the plurality of CDNs have been received. The operations 900 further include, in some embodiments, after the first period of time, but prior to the resolving of the DNS request, switching to use a different selection scheme, based on the network metrics, for resolving requests to identify a network address associated with the first domain.

In some embodiments, the DNS request comprises an Extension mechanisms for DNS (EDNS) query carrying a first Internet Protocol (IP) address used by a client device that originated the DNS query or used by an intermediate DNS resolver; and the resolving of the DNS request is further based on an autonomous system number (ASN) generated based on the first IP address.

Figure 10:
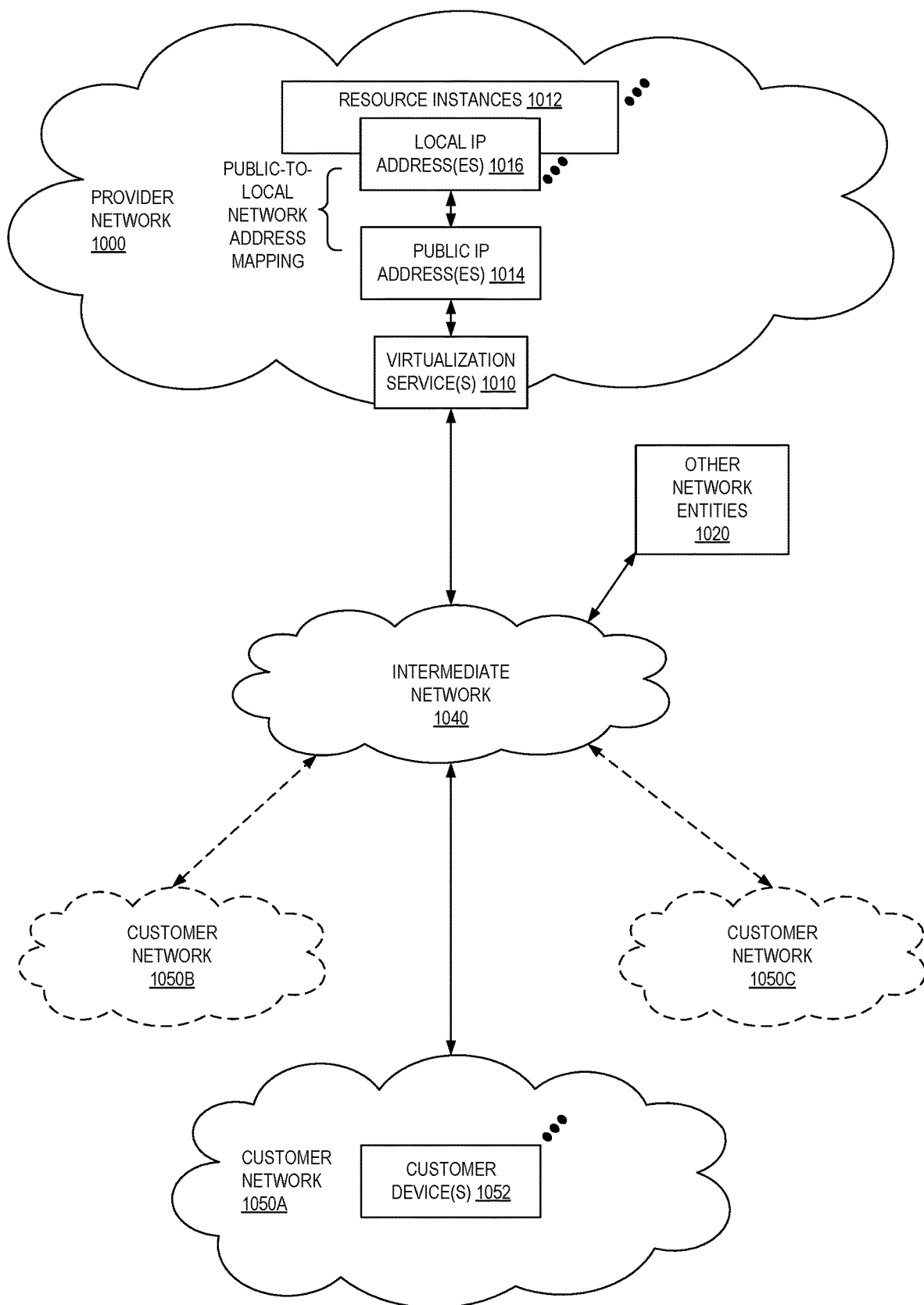
FIG. 10 illustrates an example provider network environment according to some embodiments.

FIG. 10 illustrates an example provider network (or "service provider system") environment according to some embodiments. A provider network 1000 may provide resource virtualization to customers via one or more virtualization services 1010 that allow customers to purchase, rent, or otherwise obtain instances 1012 of virtualized resources, including but not limited to computation and storage resources, implemented on devices within the provider network or networks in one or more data centers. Local IP addresses 1016 may be associated with the resource instances 1012; the local IP addresses are the internal network addresses of the resource instances 1012 on the provider network 1000. In some embodiments, the provider network 1000 may also provide public IP addresses 1014 and/or public IP address ranges (e.g., Internet Protocol version 4 (IPv4) or Internet Protocol version 6 (IPv6) addresses) that customers may obtain from the provider 1000.

Conventionally, the provider network 1000, via the virtualization services 1010, may allow a customer of the service provider (e.g., a customer that operates one or more client networks 1050A-1050C including one or more customer device(s) 1052) to dynamically associate at least some public IP addresses 1014 assigned or allocated to the customer with particular resource instances 1012 assigned to the customer. The provider network 1000 may also allow the customer to remap a public IP address 1014, previously mapped to one virtualized computing resource instance 1012 allocated to the customer, to another virtualized computing resource instance 1012 that is also allocated to the customer. Using the virtualized computing resource instances 1012 and public IP addresses 1014 provided by the service provider, a customer of the service provider such as the operator of customer network(s) 1050A-1050C may, for example, implement customer-specific applications and present the customer's applications on an intermediate network 1040, such as the Internet. Other network entities 1020 on the intermediate network 1040 may then generate traffic to a destination public IP address 1014 published by the customer network(s) 1050A-1050C; the traffic is routed to the service provider data center, and at the data center is routed, via a network substrate, to the local IP address 1016 of the virtualized computing resource instance 1012 currently mapped to the destination public IP address 1014. Similarly, response traffic from the virtualized computing resource instance 1012 may be routed via the network substrate back onto the intermediate network 1040 to the source entity 1020.

Local IP addresses, as used herein, refer to the internal or "private" network addresses, for example, of resource instances in a provider network. Local IP addresses can be within address blocks reserved by IETF RFC 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1000; a customer may then assign their allocated public IP addresses to particular resource instances allocated to the customer. These public IP addresses may be referred to as customer public IP addresses, or simply customer IP addresses. Instead of being assigned by the provider network 1000 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 11:
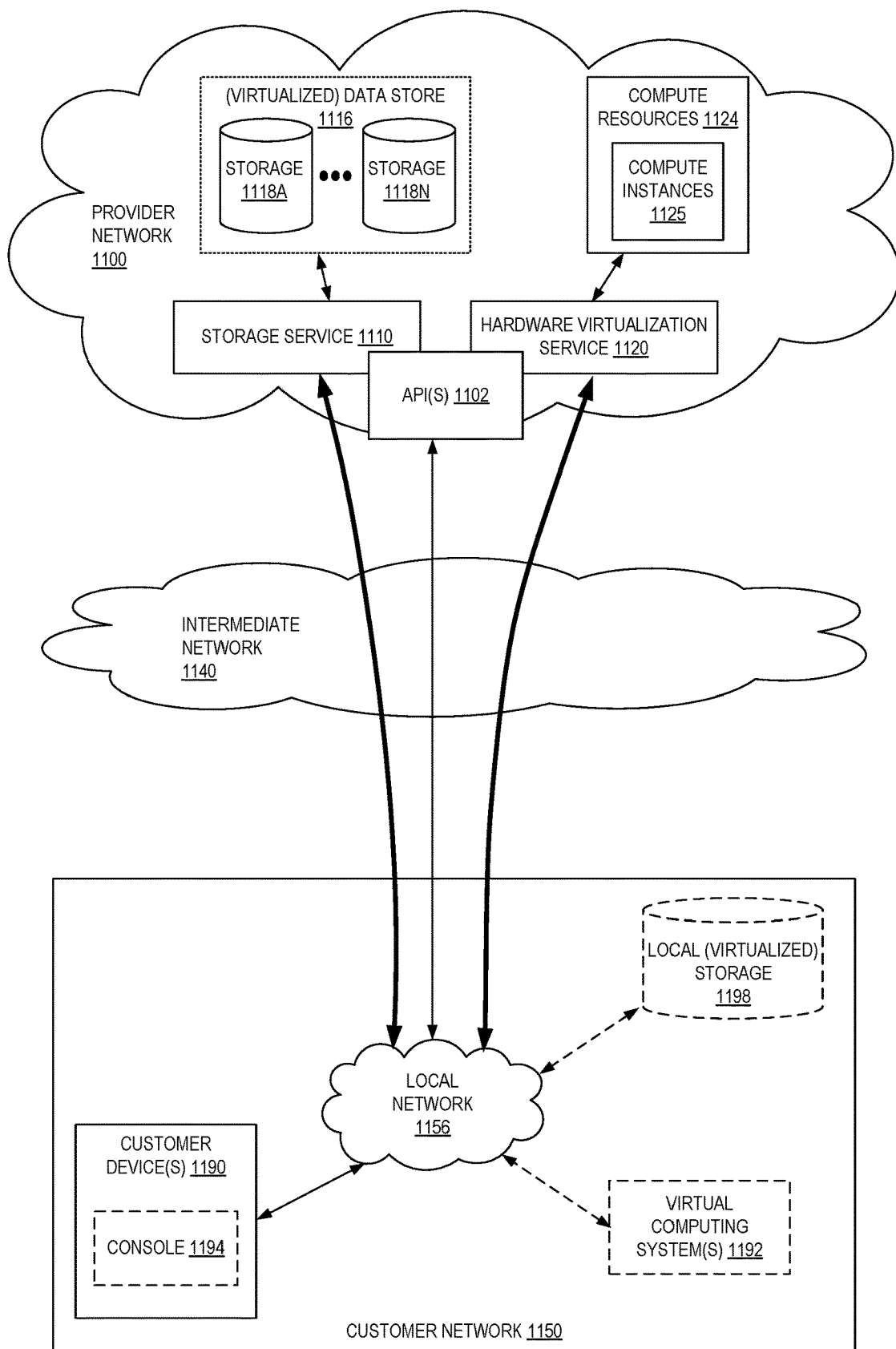
FIG. 11 is a block diagram of an example provider network that provides a storage service and a hardware virtualization service to customers according to some embodiments.

FIG. 11 is a block diagram of an example provider network that provides a storage service and a hardware virtualization service to customers, according to some embodiments. Hardware virtualization service 1120 provides multiple compute resources 1124 (e.g., compute instances 1125 such as VMs) to customers. The compute resources 1124 may, for example, be rented or leased to customers of the provider network 1100 (e.g., to a customer that implements customer network 1150). Each computation resource 1124 may be provided with one or more local IP addresses. Provider network 1100 may be configured to route packets from the local IP addresses of the compute resources 1124 to public Internet destinations, and from public Internet sources to the local IP addresses of compute resources 1124.

Provider network 1100 may provide a customer network 1150, for example coupled to intermediate network 1140 via local network 1156, the ability to implement virtual computing systems 1192 via hardware virtualization service 1120 coupled to intermediate network 1140 and to provider network 1100. In some embodiments, hardware virtualization service 1120 may provide one or more APIs 1102, for example a web services interface, via which a customer network 1150 may access functionality provided by the hardware virtualization service 1120, for example via a console 1194 (e.g., a web-based application, standalone application, mobile application, etc.). In some embodiments, at the provider network 1100, each virtual computing system 1192 at customer network 1150 may correspond to a computation resource 1124 that is leased, rented, or otherwise provided to customer network 1150.

From an instance of a virtual computing system 1192 and/or another customer device 1190 (e.g., via console 1194), the customer may access the functionality of storage service 1110, for example via one or more APIs 1102, to access data from and store data to storage resources 1118A-1118N of a virtual data store 1116 (e.g., a folder or "bucket", a virtualized volume, a database, etc.) provided by the provider network 1100. In some embodiments, a virtualized data store gateway (not shown) may be provided at the customer network 1150 that may locally cache at least some data, for example frequently-accessed or critical data, and that may communicate with storage service 1110 via one or more communications channels to upload new or modified data from a local cache so that the primary store of data (virtualized data store 1116) is maintained. In some embodiments, a user, via a virtual computing system 1192 and/or on another customer device 1190, may mount and access virtual data store 1116 volumes via storage service 1110 acting as a storage virtualization service, and these volumes may appear to the user as local (virtualized) storage 1198.

While not shown in FIG. 11, the virtualization service(s) may also be accessed from resource instances within the provider network 1100 via API(s) 1102. For example, a customer, appliance service provider, or other entity may access a virtualization service from within a respective virtual network on the provider network 1100 via an API 1102 to request allocation of one or more resource instances within the virtual network or within another virtual network.

Illustrative Systems

Figure 12:
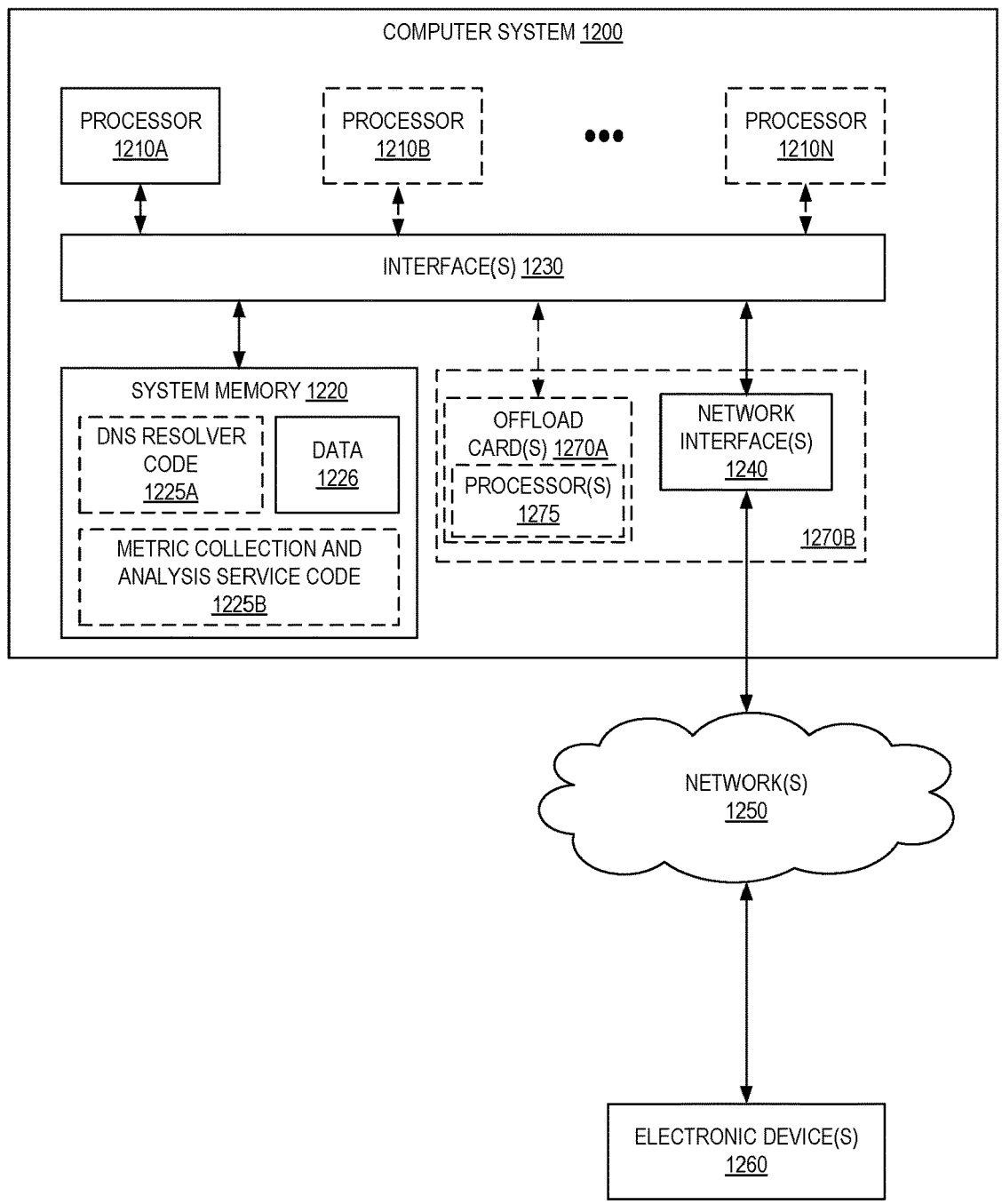
FIG. 12 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1200 illustrated in FIG. 12. In the illustrated embodiment, computer system 1200 includes one or more processors 1210 coupled to a system memory 1220 via an input/output (I/O) interface 1230. Computer system 1200 further includes a network interface 1240 coupled to I/O interface 1230. While FIG. 12 shows computer system 1200 as a single computing device, in various embodiments a computer system 1200 may include one computing device or any number of computing devices configured to work together as a single computer system 1200.

In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1210 may commonly, but not necessarily, implement the same ISA.

System memory 1220 may store instructions and data accessible by processor(s) 1210. In various embodiments, system memory 1220 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1220 as DNS resolver code 1225A (e.g., executable to implement, in whole or in part, the DNS resolver 108) and/or metric collection and analysis service code 1225B (e.g., executable to implement, in whole or in part, the metric collection and analysis service 160) and data 1226.

In one embodiment, I/O interface 1230 may be configured to coordinate I/O traffic between processor 1210, system memory 1220, and any peripheral devices in the device, including network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices 1260 attached to a network or networks 1250, such as other computer systems or devices as illustrated in FIG. 1, for example. In various embodiments, network interface 1240 may support communication via any suitable wired or wireless general data networks, such as types of Ethernet network, for example. Additionally, network interface 1240 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1200 includes one or more offload cards 1270A or 1270B (including one or more processors 1275, and possibly including the one or more network interfaces 1240) that are connected using an I/O interface 1230 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 1200 may act as a host electronic device (e.g., operating as part of a hardware virtualization service) that hosts compute resources such as compute instances, and the one or more offload cards 1270A or 1270B execute a virtualization manager that can manage compute instances that execute on the host electronic device. As an example, in some embodiments the offload card(s) 1270A or 1270B can perform compute instance management operations such as pausing and/or un-pausing compute instances, launching and/or terminating compute instances, performing memory transfer/copying operations, etc. These management operations may, in some embodiments, be performed by the offload card(s) 1270A or 1270B in coordination with a hypervisor (e.g., upon a request from a hypervisor) that is executed by the other processors 1210A-1210N of the computer system 1200. However, in some embodiments the virtualization manager implemented by the offload card(s) 1270A or 1270B can accommodate requests from other entities (e.g., from compute instances themselves), and may not coordinate with (or service) any separate hypervisor.

In some embodiments, system memory 1220 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1200 via I/O interface 1230. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1118A-1118N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving, from a computing device of a user, mapping information that associates a first domain with a plurality of domains corresponding to a plurality of content delivery networks (CDNs) and one or more identifiers of network metric types;
configuring a web application to include or reference code, wherein the web application is not associated with the first domain;
transmitting the code to a plurality of computing devices not associated with the first domain, the code including one or more commands that when executed generate at least one network metric corresponding to at least one of the network metric types;
receiving network metrics generated by the computing devices via executing the one or more commands of the code, wherein the network metrics were generated based on communications between the computing devices and at least two different CDNs of the plurality of CDNs;
transforming the network metrics into metric summary data;
receiving a domain name system (DNS) query to identify a network address associated with the first domain, wherein the first domain is associated with the plurality of CDNs;
selecting the network address based at least in part on an analysis of at least some of the metric summary data, the network address corresponding to a first CDN of the plurality of CDNs; and
transmitting a response to the DNS query that identifies the network address.

2. The computer-implemented method of claim 1, further comprising:
transmitting one or more webpages to the plurality of computing devices, the one or more webpages including a reference to the code; and
receiving a plurality of requests for the code, wherein the plurality of requests were originated by the plurality of computing devices based upon the reference to the code.

3. The computer-implemented method of claim 1, further comprising:
generating, selecting, or configuring the code based on the one or more identifiers of the network metric types.

4. A computer-implemented method comprising:
receiving, from a computing device of a user, mapping information that associates a first domain with a plurality of domains corresponding to a plurality of content delivery networks (CDNs) and one or more identifiers of network metric types;
configuring a web application to include or reference code, wherein the web application is not associated with the first domain;
transmitting the code to computing devices not associated with the first domain, the code including one or more commands that when executed generate at least one network metric corresponding to at least one of the network metric types;
receiving network metrics generated by the computing devices, wherein the network metrics were generated based on communications between the computing devices and the plurality of CDNs;
transforming the network metrics into metric summary data; and
resolving a domain name system (DNS) request for the first domain based at least in part on the metric summary data.

5. The computer-implemented method of claim 4, further comprising, prior to the resolving of the DNS request, receiving a DNS query to identify a network address associated with the first domain.

6. The computer-implemented method of claim 5, further comprising, prior to the resolving of the DNS request, selecting the network address based at least in part on an analysis of at least some of the metric summary data, the network address corresponding to a first CDN of the plurality of CDNs.

7. The computer-implemented method of claim 6, further comprising transmitting a response to the DNS query that identifies the network address.

8. The computer-implemented method of claim 4, wherein at least one of the network metric types comprises:
a customer experience score;
a latency;
a throughput;
an error rate; or
a buffer exhaustion rate.

9. The computer-implemented method of claim 4, further comprising generating, selecting, or configuring the code based on the one or more identifiers of the network metric types.

10. The computer-implemented method of claim 4, further comprising: receiving a message originated by the computing device of the user that indicates one or more policies indicating how to select between the plurality of CDNs based on the metric summary data.

11. The computer-implemented method of claim 4, further comprising:
for a first period of time, resolving requests to identify a network address associated with the first domain according to a pure or weighted round-robin scheme between the plurality of CDNs.

12. The computer-implemented method of claim 11, further comprising:
determining that a threshold amount of network metrics for each of the plurality of CDNs have been received.

13. The computer-implemented method of claim 12, further comprising:
after the first period of time, but prior to the resolving of the DNS request, switching to use a different selection scheme, based on the network metrics, for resolving requests to identify a network address associated with the first domain.

14. The computer-implemented method of claim 4, wherein:
the DNS request comprises an Extension Mechanisms for DNS (EDNS) query carrying a first Internet Protocol (IP) address used by a client device that originated the DNS query or used by an intermediate DNS resolver; and
the resolving of the DNS request is further based on an autonomous system number (ASN) generated based on the first IP address.

15. A system comprising:
a first one or more electronic devices to implement a domain name system (DNS) resolver; and
a second one or more electronic devices to implement a metric collection and analysis (MCA) service, the MCA service including instructions that upon execution cause the MCA service to:
  receive, from a computing device of a user, mapping information that associates a first domain with a plurality of domains corresponding to a plurality of content delivery networks (CDNs);
  configure a web application to include or reference code, wherein the web application is not associated with the first domain;
  transmit the code to computing devices not associated with the first domain, the code including one or more commands that when executed generate at least one network metric corresponding to at least one of the network metric types;
  receive network metrics generated by the computing devices, wherein the network metrics were generated based on communications between the computing devices and the plurality of CDNs;
  transform the network metrics into metric summary data; and
  send the metric summary data to a domain name system (DNS) resolver,
wherein the DNS resolver includes instructions that upon execution cause the DNS resolver to:
  resolve a DNS request for the first domain based at least in part on use of the metric summary data and at least some of the mapping information.

16. The system of claim 15, wherein the MCA service includes further instructions that upon execution further cause the MCA service to, prior to the resolving of the DNS request, receive a DNS query to identify a network address associated with the first domain.

17. The system of claim 16, wherein the MCA service includes further instructions that upon execution further cause the MCA service to, prior to the resolving of the DNS request, select the network address based at least in part on an analysis of at least some of the metric summary data, the network address corresponding to a first CDN of the plurality of CDNs.

18. The system of claim 15, wherein the MCA service includes further instructions that upon execution further cause the MCA service to generate, select, or configure the code based on one or more identifiers of network metric types received with the mapping information from the computing device of the user.

19. The system of claim 15, wherein at least one of the network metric types comprises:
  a customer experience score;
  a latency;
  a throughput;
  an error rate; or
  a buffer exhaustion rate.

20. The system of claim 15, wherein:
  the DNS request comprises an Extension Mechanisms for DNS (EDNS) query carrying a first Internet Protocol (IP) address used by a client device that originated the DNS query or used by an intermediate DNS resolver; and
  the resolution of the DNS request is further based on an autonomous system number (ASN) generated based on the first IP address.

* * * * *